US005082625A

United States Patent [19]

Kato et al.

[11] Patent Number: 5,082,625

[45] Date of Patent: Jan. 21, 1992

[54] CORROSION-RESISTANT ALLOY FOR BUILD-UP WELDING

[75] Inventors: Sinji Kato, Aichi; Soya Takagi, Toyota; Minoru Kawasaki, Toyota; Kazuhiko Mori, Toyota; Katsuhiko Ueda, Aichi, all of Japan

[73] Assignee: Toyota Jidosha Kabushiki Kaisha, Aichi, Japan

[21] Appl. No.: 446,818

Related U.S. Application Data

[63] Continuation-in-part of Ser. No. 339,896, Apr. 18, 1989, abandoned, which is a continuation of Ser. No. 143,641, Jan. 13, 1988, abandoned.

[22] Filed: Dec. 6, 1989

[30] Foreign Application Priority Data

Jan. 14, 1987 [JP] Japan .................................... 62-7223

[51] Int. Cl.[5] ...................... C22C 19/03; C22C 19/05; C22C 30/02

[52] U.S. Cl. .................................... 420/453; 420/458; 420/582; 420/587

[58] Field of Search ................ 420/453, 458, 582, 587

[56] References Cited

U.S. PATENT DOCUMENTS

| | | | |
|---|---|---|---|
| 2,864,969 | 12/1958 | Foreman | 420/453 |
| 3,048,485 | 8/1962 | Bieber | 420/582 |
| 3,168,397 | 2/1965 | Scharfstein | 420/582 |
| 3,476,555 | 11/1969 | Kohl et al. | 420/582 |
| 3,758,296 | 9/1973 | Johnson | 420/588 |
| 3,900,316 | 8/1975 | Jones | 420/584 |
| 4,038,752 | 8/1977 | Phelps et al. | 420/452 |
| 4,172,716 | 10/1979 | Abo et tal. | 420/41 |
| 4,216,015 | 8/1980 | Hickl et al. | 420/582 |
| 4,430,297 | 2/1984 | Crook | 420/453 |
| 4,487,744 | 12/1984 | DeBold et al. | 420/582 |
| 4,692,305 | 9/1987 | Rangaswamy et al. | 420/453 |

FOREIGN PATENT DOCUMENTS

| | | | |
|---|---|---|---|
| 51-123961 | 8/1982 | Japan . | |
| 59-170235 | 9/1984 | Japan | 420/582 |
| 61-163238 | 7/1986 | Japan . | |
| 61-288041 | 12/1986 | Japan . | |
| 0172869 | 7/1965 | U.S.S.R. | 420/582 |
| 0970364 | 9/1964 | United Kingdom | 420/453 |
| 1400588 | 7/1975 | United Kingdom . | |
| 1433857 | 4/1976 | United Kingdom . | |
| 1436047 | 5/1976 | United Kingdom . | |
| 1504284 | 3/1978 | United Kingdom . | |

*Primary Examiner*—R. Dean
*Assistant Examiner*—David W. Schumaker
*Attorney, Agent, or Firm*—Finnegan, Henderson, Farabow, Garrett & Dunner

[57] ABSTRACT

Herein disclosed, as a Ni-based corrosion-resistant alloy to be used for build-up welding, is an alloy which contains 0.5 to 2.3 wt % of copper, 0.1 to 5.3 wt % of molybdenum, 1.0 to 29.0 wt % of at least one carbide forming element except molybdenum, 1.0 to 30.0 wt % of iron, 0.6 to 2.5 wt % of silicon, 0.008 up to 1.0 wt % of boron, and 0.04 to 1.6 wt % of carbon, the remainder being composed of nickel and incidental impurities.

4 Claims, 4 Drawing Sheets

CORROSION-RESISTANT ALLOY FOR BUILD-UP WELDING

This application is a continuation-in-part of U.S. patent application No. 07/339,896 filed Apr. 18, 1989, now abandoned, which is a continuation of Ser. No. 143,641 filed Jan. 13, 1988, now abandoned.

BACKGROUND OF THE INVENTION

The present invention relates to a nickel (Ni)-based corrosion-resistant alloy to be used for build-up welding (or cladding) a metallic base in various machine parts such as the cylinder bores of internal combustion engines for automobiles and, more particularly, to a nickel-based corrosion-resistance alloy for build-up welding, which contains not only copper (Cu) and molybdenum (Mo) added to improve its corrosion resistance to acids but also silicon (Si) and boron (B) added to give self-fluxing properties.

Materials for the cylinder bores of automotive engines, especially Diesel engines are required to have not only heat and wear resistances but also excellent corrosion resistance. This requirement invokes the use of the nickel-based alloy. Since, however, the nickel per se is an expensive metal, it has been conceived to form the cylinder bore by build-up welding the nickel-based alloy to a base made of cast iron, steel or aluminum (Al) alloy. The cylinder bore of a Diesel engine has to be well resistant to acids because it is used under the corrosive circumstances of acids. This necessity cannot be sufficiently met by the ordinary nickel-based alloy of the prior art.

Meanwhile, copper and molybdenum has been added in the prior art to the nickel-based alloy so as to improve the corrosion resistance especially to acids. In Japanese Patent Publication No. 56-52982, for example, there is disclosed a nickel-based austenite of high chromium (Cr) and iron (Fe) contents, which contains 30 to 48% of Ni, 30 to 35% of Cu, 3 to 25% of Fe, 1 to 0.5% of manganese (Mn), 4 to 7.5% of cobalt (Co), 0.05 to 0.25% of carbon (C), less than 4% of Si, 2.5 to 8% of Cu and less than 3% of Mo (wherein Mo+Si is less than 4%). This alloy is vaunted by the disclosure to have excellent corrosion resistance, hardenability and malleability. Another Japanese Patent Laid-Open No. 50-75518 has disclosed an alloy which is composed mainly of Ni and Cr blended with smaller amounts of Mo, Cu and another alloy element (and which is exemplified by the composition of 63.0% of Ni, 12.0% of Cr, 5.0% of Cu, 3.0% of Mo, 3.0% of tin (Sn), 3.0% of bismuth (Bi), 1.0% of Si and 1.0% of Mn, the remainder being Fe). This alloy is also vaunted to have excellent corrosion and galling resistances. Another commercially available Ni-based alloy is known as either the "Hastelloy (registered under the trade mark) G alloy" which contains 1.5 to 2.5% of Cu and 5.5 to 7.5% of Mo or the "Hastelloy (registered under the trade mark) G-3 alloy" which contains 1.5 to 2.5% of Cu and 6.0 to 8.0% of Mo.

The above-specified Cu- and Mo-added type Ni-based alloy of the prior art is designed not as the alloy for build-up welding but as an ordinary extendible material, stressing the ductility and hot workability. The amounts of Cu and Mo added are within a range not to deteriorate or to improve the ductility and hot workability. In case those alloys of the prior art are used for the build-up welding of the surface of a metallic base so as to improve the corrosion resistance locally, they will be subject to troubles of bead cracks. In the case of the build-up welding to improve the corrosion resistance, moreover, the alloys are desired to have the so-called "self-fluxing" properties, in which the alloys will flux autogenously to form satisfactory slug, so as to reduce the pin holes or oxide intermediates in the cladding. This desire cannot be satisfied by the above-specified alloys of the prior art because of their insufficient self-fluxing properties.

SUMMARY OF THE INVENTION

The present invention has been conceived in view of the background thus far described and has an object to provide a self-fluxing Ni-based corrosion-resistance alloy for the build-up welding, which is hardly formed with blow holes and which has its corrosion resistance improved by adding Mo and Cu without forming the bead cracks when it is used for the build-up welding operation.

The causes for forming the bead cracks in the Ni-based alloy containing Mo and Cu added to improve the corrosion resistance in case the alloy is used for the build-up welding operation are thought as follows. The component Cu will segregate to invite the hot cracking while the weld bead is solidifying. The component Mo makes a harder alloy, if its addition is excessive, to cause the cold cracking while the bead is being cooled. In the alloy of the present invention, therefore, the amounts of Cu and Mo to be added are selected to fall within such proper ranges as to ensure excellent corrosion resistance and establish no bead cracking during the build-up welding operation. Moreover, proper amounts of Si and B are added to the alloy so that the alloy may have the self-fluxing properties during the build-up welding operation. Here, the Si and B are effective for the self-fluxing properties, but their amounts of addition are selected to fall within proper ranges, because they are liable to form blow holes formed when in the build-up welding operation if their content are excessive. In addition, the alloy of the present invention is made to have such a composition as to form a carbide providing the wear resistance so that it may be used as a material for parts to be subjected to sliding frictions such as the engine cylinder bore.

Specifically, the corrosion-resistance alloy for build-up welding according to the present invention is characterized by containing 0.5 to 2.3 wt % of copper, 0.1 to 5.3 wt % of molybdenum, 1.0 to 29.0 wt % of at least one carbide forming element except molybdenum, 1.0 to 30.0 wt % of iron, 0.6 to 2.5 wt % of silicon, not less than 0.008 wt % but less than 1.0 wt % of boron, and 0.04 to 1.6 wt % of carbon, the remainder being composed of nickel and irreversible impurities.

DETAILED DESCRIPTION OF THE INVENTION

Figure 1:
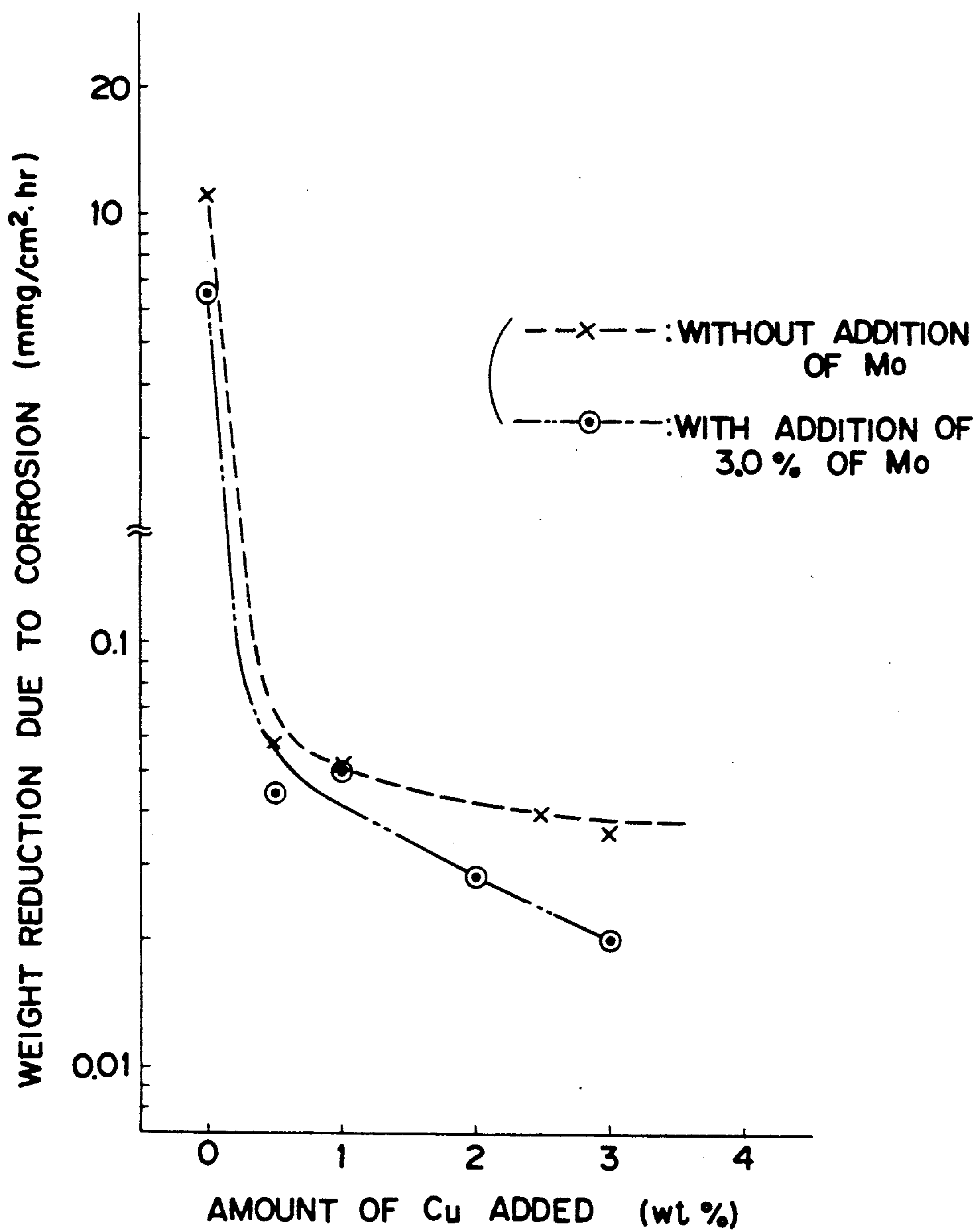
FIG. 1 is a graph plotting the relations between the amount of addition of Cu to the Ni-based alloy of Example 1 and the weight reduction due to corrosion with sulfuric acid.

First of all, the reasons for making restrictions upon the components of the corrosion-resistant alloy for build-up welding according to the present invention will be described in the following.

Cu:

The copper is an element effective for improving the corrosion resistance to acids, but its addition less than 0.5% cannot expect any appreciable effect. If the Cu addition is increased within the range of 0.5 to 1%, the corrosion resistance is remarkably improved, but even excess of the range will invite a little improvement in the corrosion resistance. Further excess over 2.3% will segregate the component Cu in the alloy during solidification of the weld bead so that the hot cracking will drastically increase to an impractical level. Thus, the addition of Cu was set within the range of 0.5 to 2.3%.

Mo:

The molybdenum is also added with a view to improving the corrosion resistance to acids. Although the sole addition of Mo exerts a slight effect upon the improvement in the corrosion resistance, its joint addition with Cu will be able to establish a combination effect to improve the corrosion resistance better than the sole addition of Cu. In the case of the joint addition, even the addition of Mo can establish little effect upon the improvement in the corrosion resistance if it is less than 0.1%. However, the content of Mo added within a range of 0.1 to 1% can increase the effect upon the improvement in the corrosion resistance. The addition of Mo in excess of 1% will augment a little the effect upon the improvement in the corrosion resistance. In connection with the weld crack, the alloy has its hardness enhanced for the addition of Mo over 5.3% so that its cold crack will increase to an impractical level while the bead is being cooled during the build-up welding operation. This sets the addition of Mo within the range of 0.1 to 5.3%. A preferable range is 0.5 to 5.3%.

Carbide Forming Element (other than Mo):

The carbide forming element other than Mo, such as Cr, W (tungsten), Nb (niobium), Ta (tantalum) or V (vanadium) will form its carbide in the build-up welding alloy to make a contribution to an improvement in the hardness and wear resistance. The addition of this element will not form a carbide sufficiently, if it is below 1.0%, but will drop the toughness if it is over 29.0%. This restricts the addition of the carbide forming element within the range of 1.0 to 29.0%. Incidentally, this addition may be either sole of one kind of element or complex of two or more kinds of elements. In the latter complex case, the total amount of the elements may be within the range of 1.0 to 29.0%.

Fe:

The iron is an element which is effective at one hand to improve the seizure resistance in case the alloy is used as materials for frictionally sliding parts and at the other to reduce the addition of expensive Ni and accordingly the production cost. The addition of Fe will deteriorate the seizure resistance, if it is less than 1.0%, but will drop the corrosion resistance if it is more than 30.0%. This sets the addition of Fe within the range of 1.0 to 30.0%.

C:

The carbon will form a hard carbide in combination with the carbide forming element to constitute a contribution to the improvement in the wear resistance. The addition of C will not form any carbide, if it is below 0.04%, but will drop the toughness if it is over 1.6%. This leads to setting of the addition of C within 0.04 to 1.6%.

Si:

The silicon is an element which is effective for affording the alloy the self-fluxing properties to form satisfactory slug during the build-up welding or cladding operation thereby to reduce the oxide intermediates and pin holes in the cladding layer to improve the depositability of the welding alloy on the base. The addition of Si will not provide sufficient self-fluxing properties, and the deposition of the welding alloy on the base is insufficient if it is below 0.6%. If the Si addition exceeds 2.5%, the extent of penetration of the welding alloy into the base during the build-up welding operation so that the amount of melting of the base is increased to form more blow holes in the cladding layer as a result of the gas generation in the molten base. In case the base is exemplified by cast iron, the blow holes are likely formed to deteriorate the mechanical properties of the cladding layer. If, moreover, more blow holes are formed in the cladding layer, the cladding cylinder bore would undesirably increase the oil consumption rate of the engine. Hence, the setting of the addition of Si is within the range of 0.6 to 2.5%. Incidentally, the preferable range of the addition of Si is within 1.2 to 2.5% so as to deposit the welding alloy sufficiently.

B (Boron):

Like Si, the boron is an element which is effective for affording the alloy the self-fluxing properties to form satisfactory slug during the build-up welding or cladding operation thereby to reduce the oxide intermediates and pin holes in the cladding layer and to improve the depositability of the welding alloy on the base. The addition of B will not provide sufficient self-fluxing properties, if it is below 0.008%, but will provide an insufficient depositability of the welding alloy on the base. If the B addition exceeds 1.0%, like the case of the Si addition exceeding 2.5%, the melting of the welding alloy into the base during the build-up welding operation so that the melting amount of the base is increased to form more blow holes in the cladding layer. Thus, the addition of B is set at not less than 0.008 but less than 1.0%.

In addition to the above-specified individual components, the alloy may contain Ni and irreversible impurities as its remaining components like the ordinary Ni-based alloy.

In the corrosion-resistance alloy containing the above-specified components for build-up welding according to the present invention, the corrosion resistance can be drastically improved far better with the addition of small amounts of Cu and Mo in combination than the sole addition of Cu or Mo. Moreover, the addition per se of Cu and Mo can be in small amounts to prevent the bead cracking during the build-up welding operation. Still moreover, the alloy can be afforded the self-fluxing properties by the addition of Si and B to form satisfactory slug during the build-up welding operation so that the oxide intermediate and pin holes in the cladding layer can be drastically reduced and so that the cladding layer can be sufficiently deposited on the base. By properly regulating the adding amounts of the Si and B, moreover, the cladding layer can be prevented from many blow holes, which might otherwise be formed by the gases generated when the base surface layer is molten during the build-up welding operation.

EXAMPLES

EXAMPLE 1

Alloys Nos. 2 to 29 were made by using the alloy designated at No. 1 in Table 1 as a base and by adding various amounts of Cu and/or Mo to the base alloy No. 1. Specific amounts of Cu and Mo added to the individual alloys are tabulated in Table 2, which include the results of examinations of both the weight reductions due to corrosion with sulfuric acid and the percentages of bead cracks in case the alloys were subjected to the build-up welding operations. The percentages of the bead cracks were examined by build-up welding the individual alloys actually to a base of gray cast iron with a laser beam under the conditions of a laser power density of 50 W/mm$^2$ and a welding speed of 300 mm/min.

The weight reductions due to corrosion (by sulfuric acid) of the materials (Nos. 1 to 5) without Mo and (Nos. 7, 12, 17, 22 and 26) with 3.0% of Mo of the alloys appearing in Table 2 are plotted in FIG. 1 against the amount of Cu added. The weight reductions due to corrosion (by sulfuric acid) of the materials (Nos. 1 and 6 to 10) without Cu and (Nos. 3 and 15 to 20) with 1.0% of Cu of the alloys appearing in Table 2 are plotted in FIG. 2 against the amount of Mo added.

It is apparent from FIG. 1 that the corrosion resistance (to sulfuric acid) of both the materials without any Mo and with 3.0% of Mo were improved better up to the content of 1% of Cu but a little over the content of 1% of Cu. The comparison between the materials without any Mo (i.e., containing Cu only) and with 3.0% of Mo (i.e., containing both Cu and Mo) also reveals that the corrosion resistance of the latter material (with both Cu and Mo) was slightly better improved than the former material (with Cu only but no Mo) although their tendencies to be improved with the increase in the amount of Cu added were substantially similar.

Figure 2:
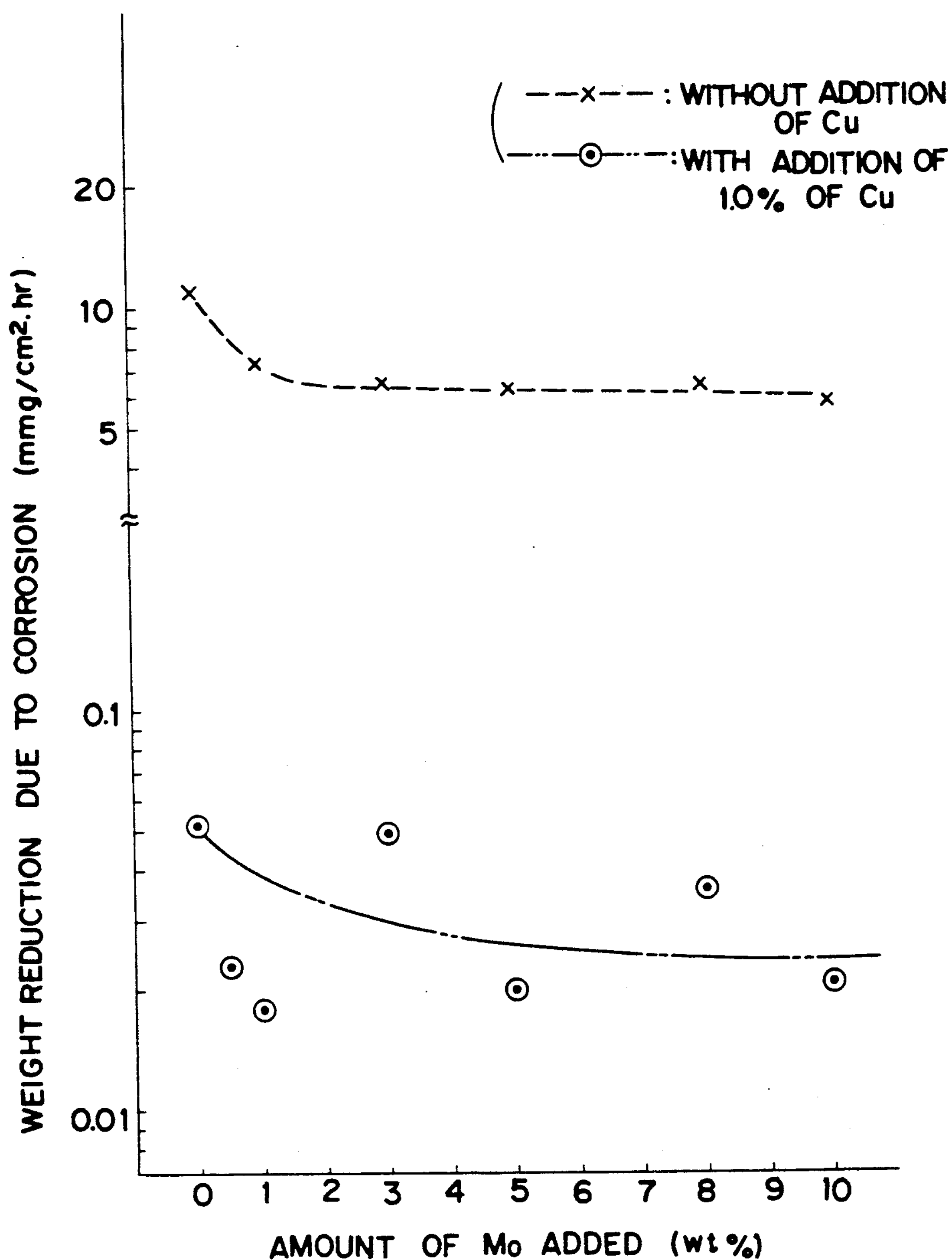
FIG. 2 is a graph plotting the relations between the amount of addition of Mo to the Ni-based alloy of Example 1 and the weight reduction due to corrosion with sulfuric acid.

It is apparent from FIG. 2. that the corrosion resistance of the material without any Cu was improved a little up to the content of 1% of Mo but no more over the content of 1% of Mo. On the other hand, it is apparent that the corrosion resistance of the material with 1.0% of Cu (i.e., containing both Cu and Mo) was far better improved than the material without any Cu (i.e., containing Mo only).

From the results plotted in FIGS. 1 and 2, it is apparent that the corrosion resistances of the material containing both of Cu and Mo are drastically improved.

Figure 3:
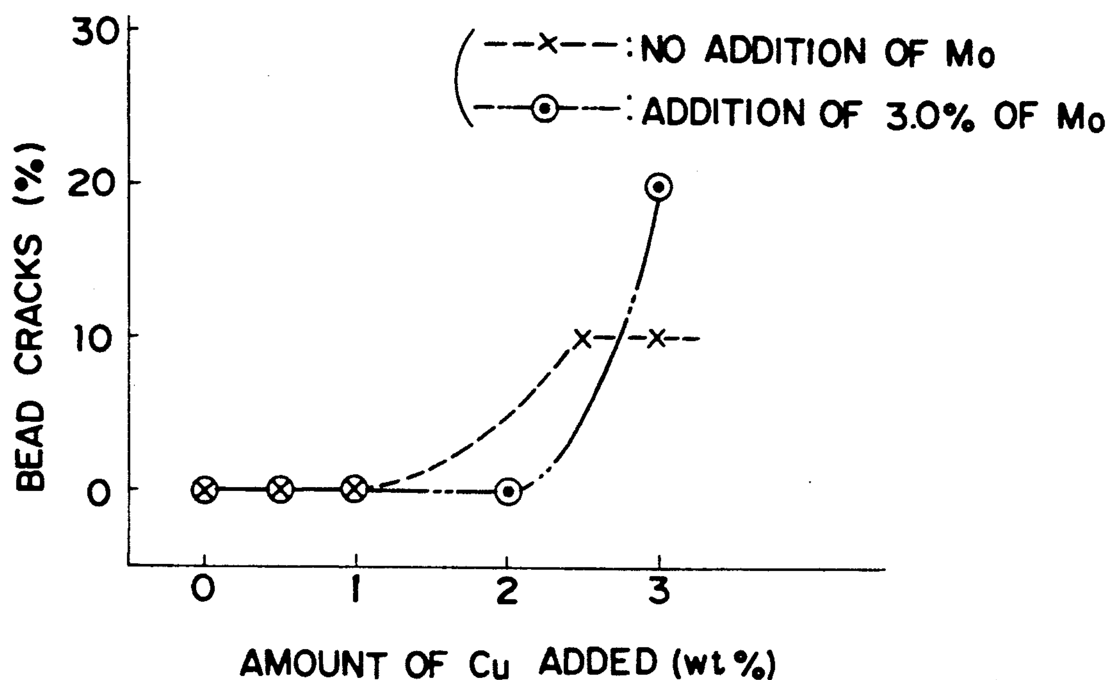
FIG. 3 is a graph plotting the relation between the amount of addition of Cu to the Ni-based alloy of Example 1 and the percentage of bead cracking during a build-up welding operation.
Figure 4:
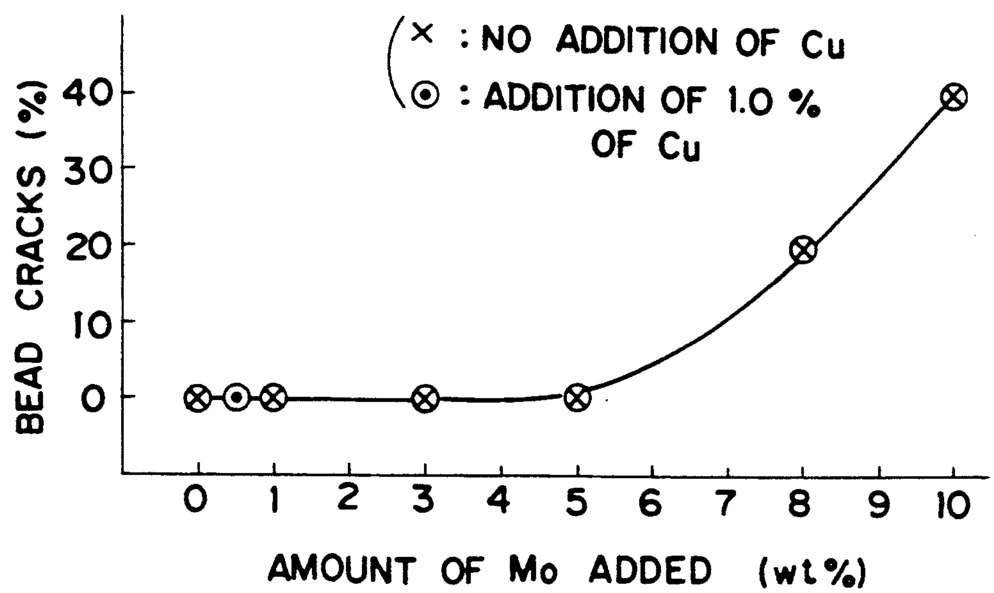
FIG. 4 is a graph plotting the relation between the amount of addition of Mo to the Ni-based alloy of Example 1 and the percentage of bead cracking during a build-up welding operation.

The percentages of bead cracks during the build-up welding operation of the materials (Nos. 1 to 5) without Mo and (Nos. 7, 12, 17, 22 and 26) with 3.0% of Mo of the alloys appearing in Table 2 are plotted in FIG. 3 against the amount of Cu added. The percentages of bead cracks during the build-up welding operation of the materials (Nos. 1 and 6 to 10) without Cu and (Nos. 3 and 15 to 20) with 1.0% of Cu of the alloys appearing in Table 2 are plotted in FIG. 4 against the amount of Mo added.

It is apparent from FIG. 3 that the percentages of the bead cracks were zero for up to the content of 2.3% of Cu no matter whether Mo might be added or not but abruptly increased over 2.3%. It is also apparent from FIG. 4 that the percentages of the bead cracks were zero up to the content of about 6% of Mo no matter whether Cu might be added or not but abruptly increased over 6%.

Synthesizing the tendencies described above, it is apparently concluded that the complex additions of 2.3% or less of Cu and 5.3% or less of Mo can improve the corrosion resistance to acids and can still prevent the bead cracks during the build-up welding operation.

TABLE 1

(in wt %)

| Alloy No. | Element for Carbide Cr | Element for Carbide W | Fe | Si | B | C | Cu | Mo | Ni |
|---|---|---|---|---|---|---|---|---|---|
| 1 | 15 | 2 | 5 | 1 | 0.7 | 0.3 | — | — | Remainder |
| 2–29 | 15 | 2 | 5 | 1 | 0.7 | 0.3 | 0–3 | 0–10 | Remainder |

TABLE 2

| Alloy No. | Comp. of Admixture | Cu (%) | Mo (%) | Wt Reduction (mmg/cm$^2$ hr.) | Cracks (%) |
|---|---|---|---|---|---|
| 1 | Base (Comp.) | — | — | 11.181 | 0 |
| 2 | Cu (Comp.) | 0.5 | — | 0.059 | 0 |
| 3 | " | 1 | — | 0.052 | 0 |
| 4 | " | 2.5 | — | 0.040 | 10 |
| 5 | " | 3 | — | 0.036 | 10 |
| 6 | Mo (Comp.) | — | 1 | 7.260 | 0 |
| 7 | " | — | 3 | 6.545 | 0 |
| 8 | " | — | 5 | 6.320 | 0 |
| 9 | " | — | 8 | 6.487 | 20 |
| 10 | " | — | 10 | 5.933 | 40 |
| 11 | Cu & Mo (Ex.) | 0.5 | 1 | 0.048 | 0 |
| 12 | " | 0.5 | 3 | 0.044 | 0 |
| 13 | " | 0.5 | 5 | 0.042 | 0 |
| 14 | Cu & Mo (Comp.) | 0.5 | 8 | 0.040 | 30 |
| 15 | Cu & Mo (Ex.) | 1 | 0.5 | 0.023 | 0 |
| 16 | " | 1 | 1 | 0.018 | 0 |
| 17 | " | 1 | 3 | 0.050 | 0 |
| 18 | " | 1 | 5 | 0.020 | 0 |
| 19 | Cu & Mo (Comp.) | 1 | 8 | 0.036 | 20 |
| 20 | " | 1 | 10 | 0.021 | 40 |
| 21 | Cu & Mo (Ex.) | 2 | 1 | 0.025 | 0 |
| 22 | " | 2 | 3 | 0.028 | 0 |
| 23 | " | 2 | 5 | 0.020 | 0 |
| 24 | Cu & Mo (Comp.) | 2 | 7 | 0.020 | 30 |
| 25 | " | 3 | 1 | 0.020 | 20 |
| 26 | " | 3 | 3 | 0.020 | 20 |
| 27 | " | 3 | 5 | 0.018 | 30 |
| 28 | " | 3 | 8 | 0.024 | 50 |
| 29 | " | 3 | 10 | 0.016 | 50 |

EXAMPLE 2

The relations of the amounts of Si and B in the Ni-based build-up welding alloy to the amount of the welding alloy melted into the base metal or cast iron, the extent of deposition of the welding alloy on the base metal, and the number of the blow holes in the cladding layer, were examined in the following manner in case the welding alloy was built up on the base metal.

Alloys Nos. 31 to 64 were made by using the alloy designated at No. 30 in Table 3 as a base and by adding various amounts of Si and B to the base alloy No. 30. Specific amounts of Si and B added to the individual alloys are tabulated in Table 4.

Figure 5:
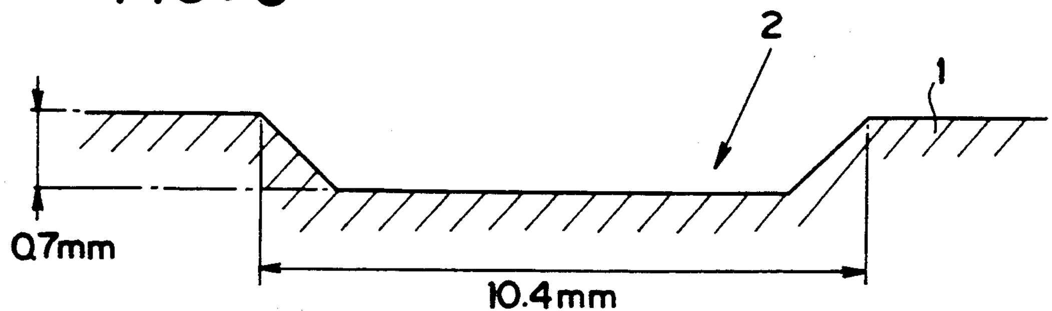
FIG. 5 is a longitudinal section showing the surface portion of a base metal according to Example 2 before the build-up welding operation.

These individual alloys were actually built up over the base metal or gray cast iron by the laser build-up welding process to examine the extent of penetration into the base metal, the extent of deposition of the welding alloy on the base metal, and the amount of the blow holes. Here, the laser build-up welding operation was accomplished by preparing a groove 2 having the shape and size, as shown in FIG. 5, in the surface of the cast iron base metal 1 and by building up the individual alloys over the groove 2 with a laser power density of 50 w/mm$^2$ and at a rate of 300 mm/min.

Figure 6:
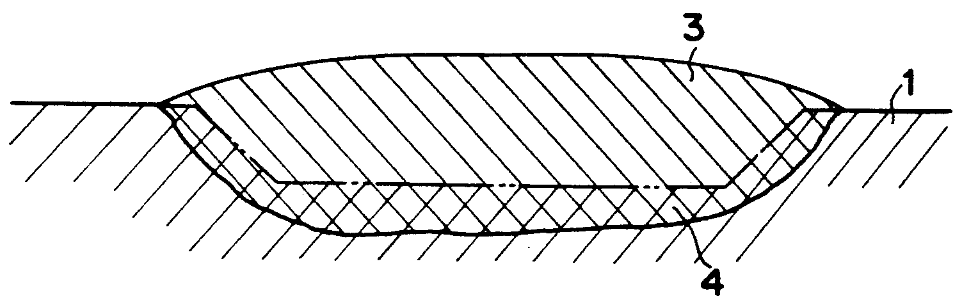
FIGS. 6 to 8 are longitudinal sections in the vicinity of the build-up welded layers and schematically show the states of Example after the build-up welding operation.
Figure 7:
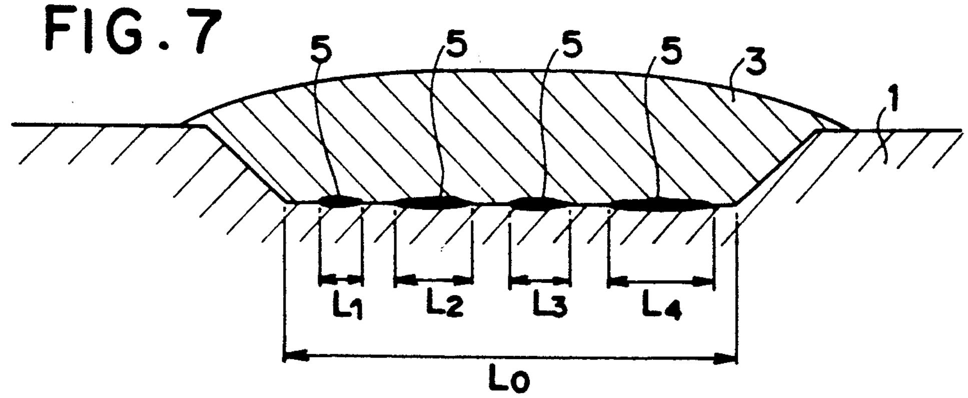

Incidentally, the extents of penetration of the welding alloys into the base metal were evaluated in terms of the cross-sectional areas of the (cross-hatched) molten portion 4 of the base metal below the cladding layer 3, as shown in FIG. 6.

On the other hand, the extent of deposition was evaluated in terms of the ratio of the total length ($L_1+L_2+L_3+ - - -$) of the deposited portions to the total length $L_0$ by examining the lengths $L_1$, $L_2$, $L_3$, and so on of the (molten) portions 5 in which the cladding layer 3 and the base metal 1 were integrally molten, as taken in the section of the cladding layer 3.

That is to say:

$$\text{Extent of Deposition} = (L_1+L_2+L_3+ - - -)/L_0 \times 100\ (\%).$$

Figure 8:
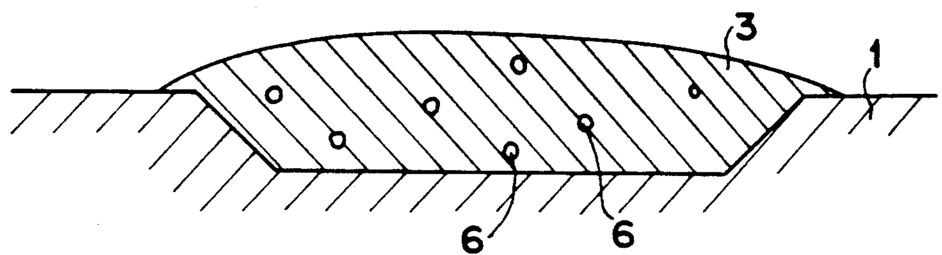

Moreover, the amount of blow holes was evaluated in terms of the total area of the sections of the blow holes 6, which are formed in the cladding layer 3, as shown in FIG. 8, by examining the areas of the individual blow holes 6 in the section of the cladding layer 3.

The results are tabulated in Table 4.

TABLE 3

(in wt %)

| Alloy No. | Cr | Fe | C | Cu | Mo | Si | B | Ni |
|---|---|---|---|---|---|---|---|---|
| 30 | 15 | 5 | 0.3 | 1 | 1 | — | — | Remainder |
| 31-64 | 15 | 5 | 0.3 | 1 | 1 | 0.5-5.0 | 0.0006-3.0 | Remainder |

TABLE 4

| Alloy No. | Si (%) | B (%) | Amount of Penetration (mm$^2$) | Area of Blowholes (mm$^2$) | Extent of Deposition (%) | Remarks |
|---|---|---|---|---|---|---|
| 31 | 0.5 | 0.006 | 0 | 0 | 23 | Ref. |
| 32 | 0.5 | 0.01 | 0 | 0 | 39 | " |
| 33 | 0.5 | 0.7 | 0 | 0 | 72 | " |
| 34 | 0.6 | 0.006 | 0 | 0 | 42 | " |
| 35 | 0.6 | 0.01 | 0 | 0 | 98 | Invention |
| 36 | 0.6 | 0.7 | 0 | 0 | 100 | " |
| 37 | 0.6 | 0.9 | 0.15 | 0.03 | 100 | " |
| 38 | 0.6 | 1.1 | 1.05 | 0.30 | 100 | Ref. |
| 39 | 0.6 | 1.4 | 1.3 | 0.41 | 100 | " |
| 40 | 0.6 | 2.0 | 1.5 | 0.51 | 100 | " |
| 41 | 0.6 | 3.0 | 2.2 | 0.79 | 100 | " |
| 42 | 1.0 | 0.7 | 0 | 0 | 100 | Invention |
| 43 | 1.0 | 1.4 | 1.4 | 0.47 | 100 | Ref. |
| 44 | 1.0 | 2.0 | 1.5 | 0.49 | 100 | " |
| 45 | 2.0 | 0.006 | 0 | 0 | 65 | " |
| 46 | 2.0 | 0.01 | 0 | 0 | 100 | Invention |
| 47 | 2.0 | 0.7 | 0.1 | 0.02 | 100 | " |
| 48 | 2.0 | 0.9 | 0.15 | 0.045 | 100 | " |
| 49 | 2.0 | 1.1 | 1.15 | 0.33 | 100 | Ref. |
| 50 | 2.0 | 1.4 | 1.45 | 0.42 | 100 | " |
| 51 | 2.0 | 2.0 | 1.65 | 0.62 | 100 | " |
| 52 | 2.5 | 0.006 | 0 | 0 | 76 | " |
| 53 | 2.5 | 0.01 | 0.05 | 0.01 | 100 | Invention |
| 54 | 2.5 | 0.7 | 0.25 | 0.06 | 100 | " |
| 55 | 2.5 | 0.9 | 0.30 | 0.07 | 100 | " |
| 56 | 2.5 | 1.1 | 1.35 | 0.395 | 100 | Ref. |
| 57 | 2.5 | 1.4 | 1.45 | 0.51 | 100 | " |

TABLE 4-continued

| Alloy No. | Si (%) | B (%) | Amount of Penetration (mm$^2$) | Area of Blowholes (mm$^2$) | Extent of Deposition (%) | Remarks |
|---|---|---|---|---|---|---|
| 58 | 2.5 | 2.0 | 1.7 | 0.69 | 100 | " |
| 59 | 3.0 | 0.01 | 1.25 | 0.35 | 100 | " |
| 60 | 3.0 | 0.7 | 1.4 | 0.59 | 100 | " |
| 61 | 3.0 | 1.4 | 1.6 | 0.66 | 100 | " |
| 62 | 3.0 | 2.0 | 1.8 | 0.80 | 100 | " |
| 63 | 3.0 | 3.0 | 2.6 | 1.01 | 100 | " |
| 64 | 5.0 | 0.7 | 2.0 | 0.785 | 100 | " |

It is apparent from Table 4 that the amounts of penetration into the base metal were increased to increase the amount of blow holes in the cladding layer in case the amount of Si exceeded 2.5% and in case the amount of B was no less than 1.0%. In case the amount of Si is less than 0.6% and in case the amount of B is less than 0.008%, on the other hand, the deposition of the cladding layer on the base metal was insufficient. It is, therefore, apparent that $0.6\% \leq Si \leq 2.5\%$ and $0.008\% \leq B < 1.0\%$ be necessary for minimizing the blow holes and sufficing the deposition of the cladding layer.

Moreover, the relations between the amount of the blow holes in the cladding layer and the consumption rate of engine oil were examined, in case the cladding layer was formed in the vicinity of the top dead center of the cylinder bore of the practical engine, and their results are tabulated in Table 5. The engine used here was a four-cylinder Diesel engine having a displacement of 2,000 cc. Incidentally, the amount of blow holes were evaluated in terms of the aforementioned blow hole area.

TABLE 5

| | Blowhole Area (mm) | Oil Consumption Rate (l/10,000 km) |
|---|---|---|
| a | 0 | 0.44 |
| b | 0.08 | 0.42 |
| c | 0.14 | 0.56 |
| d | 0.22 | 1.51 |
| e | 0.41 | 2.20 |

It is apparent from Table 5 that the coil consumption rate grows the higher for the larger blow hole area. It can apparently be concluded that the build-up welding alloy having the smaller area of blow holes in the cladding layer in accordance with the present invention can effectively reduce the oil consumption rate if it is used for build-up welding the cylinder bore of the engine.

As is now apparent from the Examples thus far described, the corrosion-resistant alloy for build-up welding according to the present invention is excellent in corrosion resistance especially to acids and free from any bead crack during the build-up welding operation. The alloy of the present invention has the self-fluxing properties and its cladding layer less formed with the blow holes. The alloy is excellent not only in wear resistance but also heat resistance because it belongs to the Ni-based alloy. If the alloy of the present invention is used for build-up welding parts such as the cylinder bores of Diesel engines, which are held under the corrosive circumstances by acids and required to have sufficient wear and heat resistances, it can afford sufficient corrosion, wear and heat resistances without incurring any bead crack and can minimize the consumption rate of the engine oil.

What is claimed is:

1. A corrosion-resistant alloy for build-up welding, containing 0.5 to 2.3 wt % of copper, 0.1 to 5.3 wt % of molybdenum, 1.0 to 29.0 wt % of at least one carbide forming element except molybdenum, 1.0 to 30.0 wt % of iron, 0.6 to 2.5 wt % of silicon, 0.008 up to 1.0 wt % of boron, and 0.04 to 1.6 wt % of carbon, the remainder being composed of nickel and incidental impurities.

2. A corrosion-resistant alloy according to claim 1, wherein the content of said silicon is within a range of 1.2 to 2.5 wt %.

3. A corrosion-resistant alloy according to claim 1, wherein the content of said molybdenum is within a range of 0.5 to 5.3 wt %.

4. A corrosion-resistant alloy according to claim 1, wherein said carbide forming element is selected from the group consisting of chromium, tungsten, niobium, tantalum and vanadium.

* * * * *